April 2, 1968   F. A. SHERWOOD   3,376,033
UNITIZED COMPOSITE SPRING CONSTRUCTION
Filed May 2, 1966

INVENTOR.
Frank A. Sherwood
BY
W. F. Wagner
ATTORNEY

United States Patent Office 3,376,033
Patented Apr. 2, 1968

3,376,033
UNITIZED COMPOSITE SPRING
CONSTRUCTION
Frank A. Sherwood, Warren, Mich., assignor to General
Motors Corporation, Detroit, Mich., a corporation of
Delaware
Filed May 2, 1966, Ser. No. 546,732
7 Claims. (Cl. 267—47)

This invention relates to spring constructions and more particularly to composite leaf spring constructions utilizing fiberglass reinforced plastic material as the elastic medium.

In recent years, it has been demonstrated that springs constructed of fiberglass reinforced plastics exhibit an elastic modulus which indicates a high degree of utility in, for example, motor vehicle suspension. It is, however, recognized that the fabrication of such springs is, as yet, relatively expensive in comparison to conventional metal springs of the same overall dimensions.

Accordingly, it is an object of this invention to provide a composite leaf spring construction which utilizes the reinforced plastic material only in that portion of the spring construction which is subject to high moment.

In keeping with the foregoing object, there is provided a composite leaf spring in which the central elastically active portion is formed of fiberglass reinforced plastic, while the opposite end portions are formed of essentially non-flexible metal elements. The foregoing and other objects, advantages and features of the invention will become more readily apparent as reference is had to the accompanying sheet of drawings wherein.

Figure 1:
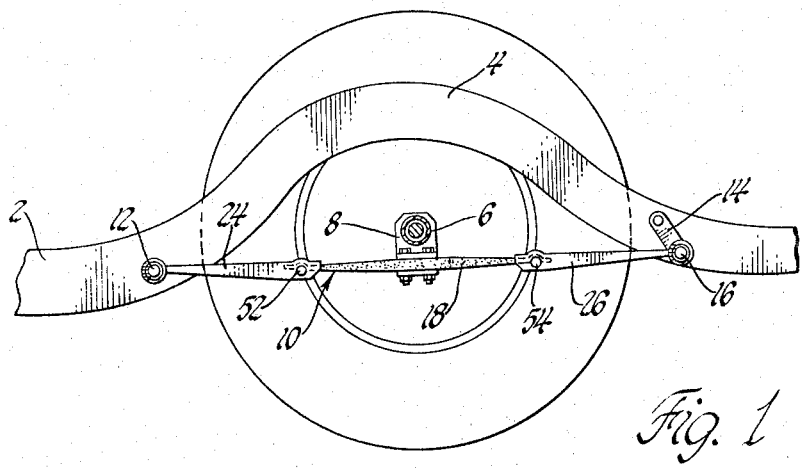
FIGURE 1 is a fragmentary side elevational view of a vehicle suspension embodying the invention.

Referring now to the drawing and particularly FIGURE 1, there is shown a portion of a vehicle chassis in which the reference numeral 2 generally designates one of a pair of vehicle frame side rails which includes an upwardly arched portion 4 overlying the the usual wheel supporting axle 6. Axle 6 in turn is secured by a clamp assembly 8 to the longitudinal midportion of a composite leaf spring assembly 10. At its forward end, spring assembly 10 is pivotally attached to side rail 2 by a pin joint 12 while its rearward end is pivotally attached to a shackle assembly 14 by a pin joint 16.

In accordance with the present invention, composite spring 10 is formed of a central elastically active portion 18 having longitudinal opposite ends 20 and 22 secured to channel section essentially rigid metal elements 24 and 26 which extend respectively forwardly and rearwardly for engagement with pin joints 12 and 16. According to the principal feature of the invention, the intermediate or central elastic portion 18 is formed or fiberglass reinforced plastic and is so shaped as to provide the requisite deflection characteristics. The forward and rearward rigid members 24 and 26, in turn, cooperate with central portion 18 to enable selection and location of pivotal connections for the entire spring which will afford the desired geometry of motion for the wheel axle 6. In utilizing a construction of the type described, two significant advantages are obtained over a corresponding structure fabricated entirely of fiberglass reinforced plastic. First, the physical quantity of relatively expensive fiberglass reinforced plastic material is limited to that area of the entire spring where significant contribution to spring rate is realized, and second, the utilization of stamped or pressed metal end elements facilitates the formation of cylindrical spring eyes 28 and 30 which surround the pin joints 12 and 16. The latter aspect is of particular significance in view of the inordinately slow process involved in fabricating corresponding spring eyes in a spring formed entirely of fiberglass reinforced plastic.

Figure 2:
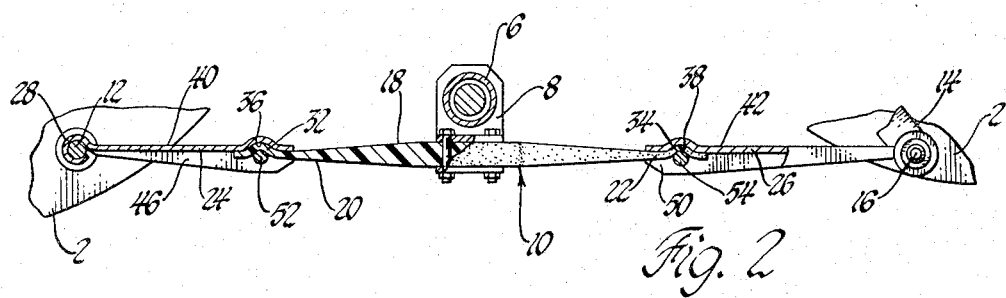
FIGURE 2 is an enlarged view, partly in section, showing details of construction of the composite spring.
Figure 3:
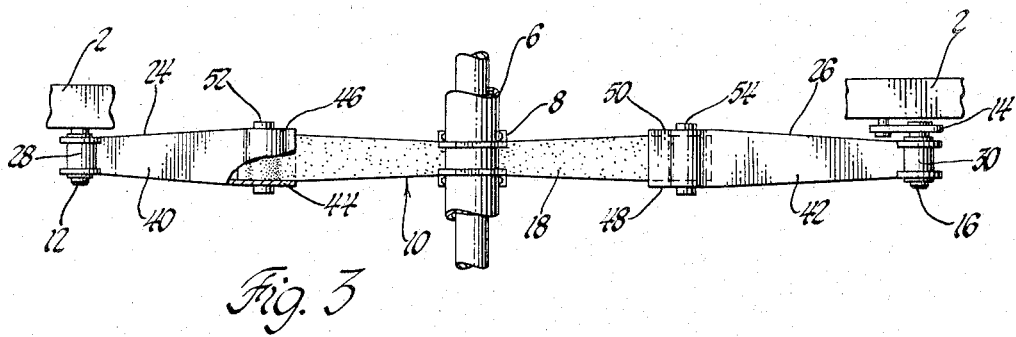
FIGURE 3 is a plan view of the construction shown in FIGURE 2.

According to another feature of the invention, there is provided a simple, efficient and economical means for effecting operative engagement between the three individual sections of the spring. As seen best in FIGURE 2, near each opposite end 20 and 22 the central portion 18 of the spring is deformed upwardly to provide curved transversely extending portions 32 and 34 which are adapted for nesting abutting relation with corresponding curved portions 36 and 38 formed in the top walls 40 and 42 of metal end pieces 24 and 26. Pieces 24 and 26 are additionally provided with transversely spaced longitudinally extending side walls 44–46 and 48–50 which straddle the side edges of the adjacent ends 20 and 22 of central portion 18 and have extending therethrough press fitted pins 52 and 54 which maintain the curved portions 32 and 34 in interlocking engagement with curved portions 36 and 38. With the connection thus afforded, the three-section spring forms a unitary spring construction which is longitudinally and laterally stable while exhibiting reaction to bending deflection comparable to that which would be attained with a one-piece spring.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. In a suspension structure including a sprung and an unsprung mass, a unitized composite leaf spring comprising opposite end portions substantially insensitive to bending loads along their lengths rigidly connected to a central portion of fiberglass reinforced plastic which is elastically deformable responsive to bending loads imposed along the entire length of said spring.

2. The structure set forth in claim 1 including means for pivotally attaching the opposite extremities of said end portions to said sprung mass, and means for attaching the central portion to said unsprung mass.

3. A leaf spring construction comprising a longitudinally extending flexible central portion formed of fiberglass reinforced plastic, a pair of longitudinally extending rigid elements disposed at opposite ends of said central portion in alignment with the major axis thereof, and means connecting the opposite ends of said central portion with the adjacent ends of said rigid elements to form a unitary leaf spring having an effective length equal to the distance between the opposite extremities of said rigid portions.

4. The structure set forth in claim 3 wherein said rigid elements are channel shaped in cross section and arranged in straddling overlapping engagement with the opposite ends of said central portion.

5. The structure set forth in claim 4 wherein the opposite ends of said central portion are formed with transversely extending upwardly curved portions adapted for mating engagement with transversely extending upwardly curved portions formed in said rigid elements.

6. The structure set forth in claim 5 wherein said rigid elements and the opposite ends of said central portion are secured together by transversely extending pins carried by said rigid elements disposed in nesting relation with the lower surface of the upwardly curved portions of said central portion.

7. The structure set forth in claim 6 including means forming transversely extending cylindrical eyes at the longitudinal opposite extremities of said rigid elements.

References Cited

UNITED STATES PATENTS 3,190,632   6/1965   Bareny _____ 267—47

ARTHUR L. LA POINT, *Primary Examiner.*

R. M. WOHLFARTH, *Assistant Examiner.*